United States Patent [19]
Suzuki

[11] Patent Number: 5,671,450
[45] Date of Patent: Sep. 23, 1997

[54] STEREO IMAGE FORMING ADAPTER

[75] Inventor: Etsurou Suzuki, Yokohama, Japan

[73] Assignee: Canon Kabushiki Kaisha, Tokyo, Japan

[21] Appl. No.: 504,469

[22] Filed: Jul. 20, 1995

[30] Foreign Application Priority Data

Jul. 21, 1994 [JP] Japan .................. 6-190969

[51] Int. Cl.$^6$ .................................. G03B 35/08
[52] U.S. Cl. .......................... 396/227; 396/331
[58] Field of Search ............... 354/110–119, 295; 396/322, 324, 326, 327, 328, 331

[56] References Cited

U.S. PATENT DOCUMENTS

| 4,437,745 | 3/1984 | Hajnal | 354/117 |
| 5,532,777 | 7/1996 | Zanen | 354/114 |

FOREIGN PATENT DOCUMENTS

| 3-102341 | 4/1991 | Japan . |
| 3-102339 | 4/1991 | Japan . |
| 3-102340 | 4/1991 | Japan . |
| 3108242 | 11/1991 | Japan . |
| 5-45751 | 2/1993 | Japan . |
| 576181 | 3/1993 | Japan . |
| 5-158169 | 6/1993 | Japan . |

Primary Examiner—David M. Gray
Attorney, Agent, or Firm—Fitzpatrick, Cella, Harper & Scinto

[57] ABSTRACT

A stereo image forming adapter mounted forwardly of the zoom lens of a camera is provided with a plurality of deflecting members disposed at spacing intervals for deflecting light from an object, and a reflecting member for reflecting light flux from each of the deflecting members toward the zoom lens, the spacing interval between deflecting members is varied in operative association with expansion and contraction of the focal length resulting from zooming of the zoom lens.

20 Claims, 9 Drawing Sheets

STEREO IMAGE FORMING ADAPTER

BACKGROUND OF THE INVENTION

1. Field of the Invention

This invention relates to a stereo adapter, and particularly to a stereo adapter to be mounted, for example, on the photo-taking lens of a photographic camera, a video camera or the like, and which is designed to be removably mounted forwardly of or in the optical path of a photo-taking lens having a focal length changing function to form a plurality of object images having a parallax.

2. Related Background Art

There are known various apparatuses for photographing a plurality of object images (hereinafter simply referred to also as stereo images) having a parallax on one or more frames of film, and making the image information of the stereo images for the left eye and the image information of the stereo images for the right eye enter the left and right eyes, respectively, thereby to photograph a stereo image in which the image information also can be stereoscopically viewed. For example, the following apparatuses have been proposed:

(1) Japanese Laid-Open Utility Model Application No. 3-108242 and Japanese Laid-Open Patent Application No. 5-45751 propose photographing apparatuses wherein a plurality of photo-taking optical systems are disposed in a camera so as to have a parallax and images are photographed on a divided frame divided or a plurality of frames. These photographing apparatuses are compact and yet designed to provide a sufficient stereoscopic feeling.

(2) Japanese Laid-Open Patent Application No. 3-102339, Japanese Laid-Open Patent Application No. 3-102340 and Japanese Laid-Open Patent Application No. 3-102341 propose stereo cameras wherein a plurality of cameras are disposed at spaced intervals so as to have a parallax and the respective cameras are mutually controlled to thereby provide a stereoscopic photograph.

(3) Japanese Laid-Open Patent Application No. 5-158169 proposes a stereo adapter to be mounted forwardly of a photo-taking lens wherein a light flux entering the photo-taking lens is divided into two light fluxes so as to have a parallax and object images for the left eye and the right eye, respectively, are recorded on the two halves of one frame by the two light fluxes. By using this stereo adapter, ordinary cameras are adapted to effect the photographing of stereo images easily.

The above-described examples of the conventional art have suffered from the following problems:

(1) If in a stereo camera having a plurality of photo-taking lenses, an attempt is made to set the distance between the optical axes of the photo-taking lenses (the stereo base), which is one of important factors in determining a stereoscopic feeling, to a great value, then the camera will become correspondingly large, and this has led to the problem that realistically it is difficult to obtain a stereo base equal to or greater than the spacing between human pupils.

Also, if as the stereo base becomes greater, the interval between object images formed on the surface of film will also become greater and therefore, and it will become necessary to provide a film format for exclusive use or complicated optical processing for correcting this image sizing, and this has led to problems such as reduced flexibility and complicated apparatus construction.

(2) In a stereo camera wherein a plurality of cameras are disposed with a desired stereo base therebetween to thereby effect stereo photographing, the use of the discrete cameras has led to the problem that simplification is difficult to achieve and portability is bad.

Also, the determination of the value of the stereo base and the convergence angle must be done by a photographer himself and the knowledge thereof is necessary, and this has led to the problem that operation is difficult.

(3) A stereo adapter for forming object images having a parallax through a photo-taking lens can be mounted on the photo-taking lens of a conventional camera and can effect stereo photographing relatively easily, but if the specification of the photo-taking lens on which the stereo adapter is mounted changes, the formed state of object images will differ.

Particularly in recent years, photo-taking lenses having a focal length changing portion (zoom lenses) have come to be widely used, and it is desired to mount the stereo adapter on a zoom lens. However, this has posed the following problems.

3-1. Generally, the stereo adapter is set so that the stereo base may correspond to the spacing between human eyes, whereby a natural stereoscopic feeling may be obtained.

This has led to the problem that even if expressly by the use of a zoom lens, an object at a long distance is photographed at a high magnification; the longer is the distance of the object, the smaller becomes the convergence angle and a natural stereoscopic feeling is not obtained and the photograph lacks presence.

3-2. When the focal length of the photo-taking lens, which is the standard for mounting the stereo adapter, is determined as f1, the stereo base for obtaining a desired convergence angle, the direction of a deflecting surface, the size of the deflecting surface, etc. become naturally determined.

When the stereo adapter of which the various factors have been thus set is mounted on a zoom lens, if the focal length f1 is long as compared with the focal length fw of the wide end, it has posed the problem that when photographing is to be effected at the wide end, not all light fluxes can be covered and unnecessary portions are photographed.

Figure 9A:
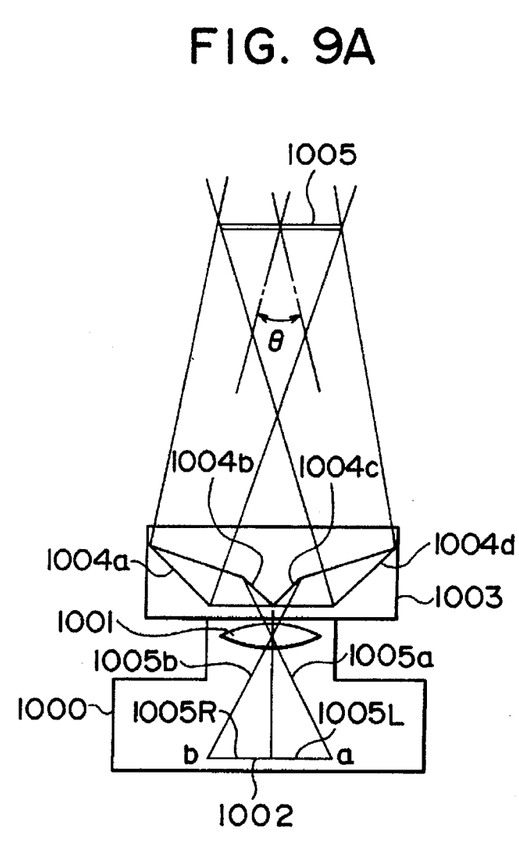
FIG. 9A shows the optical action when a stereo adapter is mounted on a camera.

This will hereinafter be described with reference to FIGS. 9A and 9B of the accompanying drawings. In FIG. 9A, the reference numeral 1000 designates a photographic camera which is designed such that the image of an object 1005 is formed on the surface of film 1002 by a zoom lens 1001.

The reference numerals 1003 denotes a stereo adapter having two sets of mirrors 1004a, 1004b, 1004c, 1004d.

In FIG. 9A, the focal length of the photo-taking lens 1001 is f1 and the convergence angle formed at this time on the object side by the principal rays of light fluxes forming object images 1005R and 1005L, respectively, is θ.

Figure 9B:
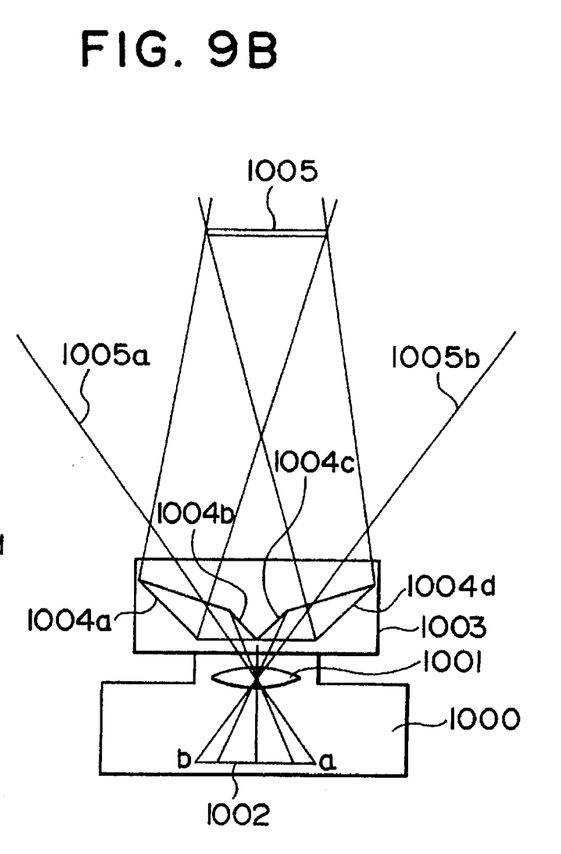
FIG. 9B shows the problems when a photo-taking lens is set to the wide angle end.

FIG. 9B shows a case where the zoom lens 1001 has been zoomed from FIG. 9A toward the wide angle side.

When rays of light entering the end portions a and b of the photographing range on the film 1002 are defined as 1005a and 1005b, respectively, the rays of light 1005a and 1005b are deflected by the mirrors 1004a, 1004d and the mirrors 1004b, 1004c and enter the end portions a and b, in FIG. 9A. In contrast, in FIG. 9B, the zoom lens 1001 has been moved more toward the wide side, whereby light fluxes 1005a and 1005b are more widened, and if photographing is effected in this state, there will be created a light flux which is bent by the mirror optical system 1004a to 1004d and a light flux which directly enters without passing through the mirror optical system 1004a to 1004d and unnatural images will be formed at the opposite ends of the image field.

3-3. When the stereo adapter is mounted forwardly of the zoom lens, if the angle of field is varied by zooming, the position of the image of the main object composed at the center will deviate.

Particularly, if the deviation is too great when zooming is effected toward the telephoto side, the main object will not be photographed and stereoscopic view will become impossible.

Figure 10A:
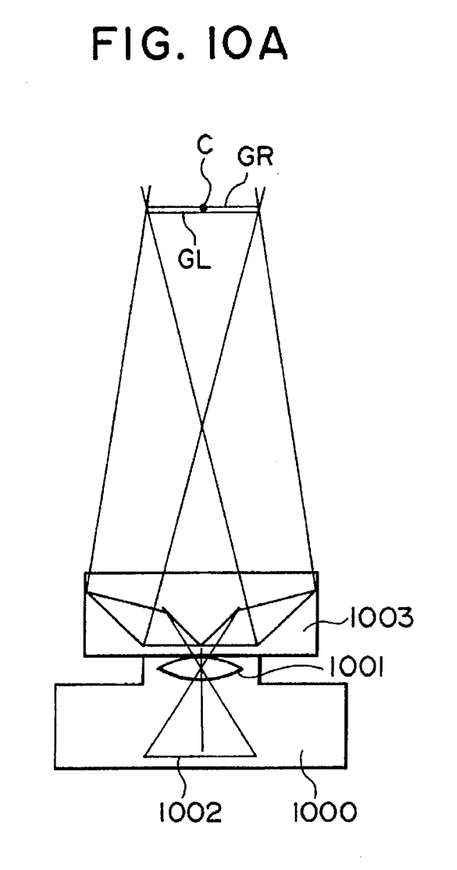
FIG. 10A shows the optical action when a stereo adapter is mounted on a camera.

This will now be described with reference to FIGS. 10A and 10B of the accompanying drawings. In FIG. 10A, let it be assumed that when a certain focal length of the zoom lens 1001 is f1, the various elements of the stereo adapter are set so that images GL and GR for the left and right eyes may have the main object C substantially centrally thereof.

Figure 10B:
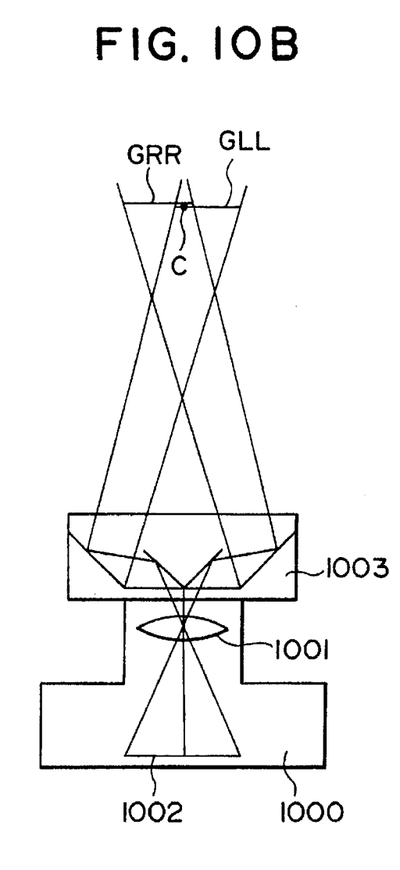
FIG. 10B shows the problems when a photo-taking lens is set to the telephoto end.

Assuming that with the stereo adapter kept in this state, the focal length of the zoom lens 1001 is changed, for example, to ft which is longer than f1, the area in which the images GLL and GRR for the left and right eyes overlap each other will decrease as shown in FIG. 10B.

For example, the main object C, if photographed in the state of FIG. 10B, will be photographed on the opposite end portions in one frame of the film 1002, and even if this is appreciated in the form of print, stereoscopic view will be difficult.

3-4. The stereo adapter of Japanese Laid-Open Patent Application No. 5-76181 is designed such that a mirror on one side is movable back and forth and the stereo base is manually adjusted, but it is not one in which the adjustment is made in conformity with the focal length or the object distance, and this has led to the problem that it is difficult to adjust the stereo base to an appropriate stereo base.

SUMMARY OF THE INVENTION

It is an object of the present invention to provide an apparatus for forming an image for stereoscopic view.

It is another object of the present invention to enable an appropriate image to be obtained without resorting to the focal length changing operation of a photo-taking lens having the focal length changing function when an image for stereoscopic view is to be formed with the apparatus mounted on the photo-taking lens.

It is still another object of the present invention to provide a stereo adapter which, when a photo-taking lens having it mounted thereon is changed in its focal length, can appropriately adjust the position of a deflecting surface with the focal length change to thereby achieve the downsizing of the apparatus and yet form a good stereo image even if the focal length of the photo-taking lens fluctuates.

It is still another object of the present invention to provide a stereo adapter which is designed to be removably mounted in the optical path of a photo-taking lens having a focal length changing portion and in which a plurality of deflecting surfaces are disposed at spaced intervals and a light flux from an object is passed through the plurality of deflecting surfaces, and thereafter is directed to the photo-taking lens, thereby forming a plurality of object images having a parallax and the relative position of the plurality of deflecting surfaces is displaced in a plane containing the center axis of the light flux entering the plurality of deflecting surfaces, in operative association with the focal length change of the focal length changing portion.

DESCRIPTION OF THE PREFERRED EMBODIMENTS

Figure 1:
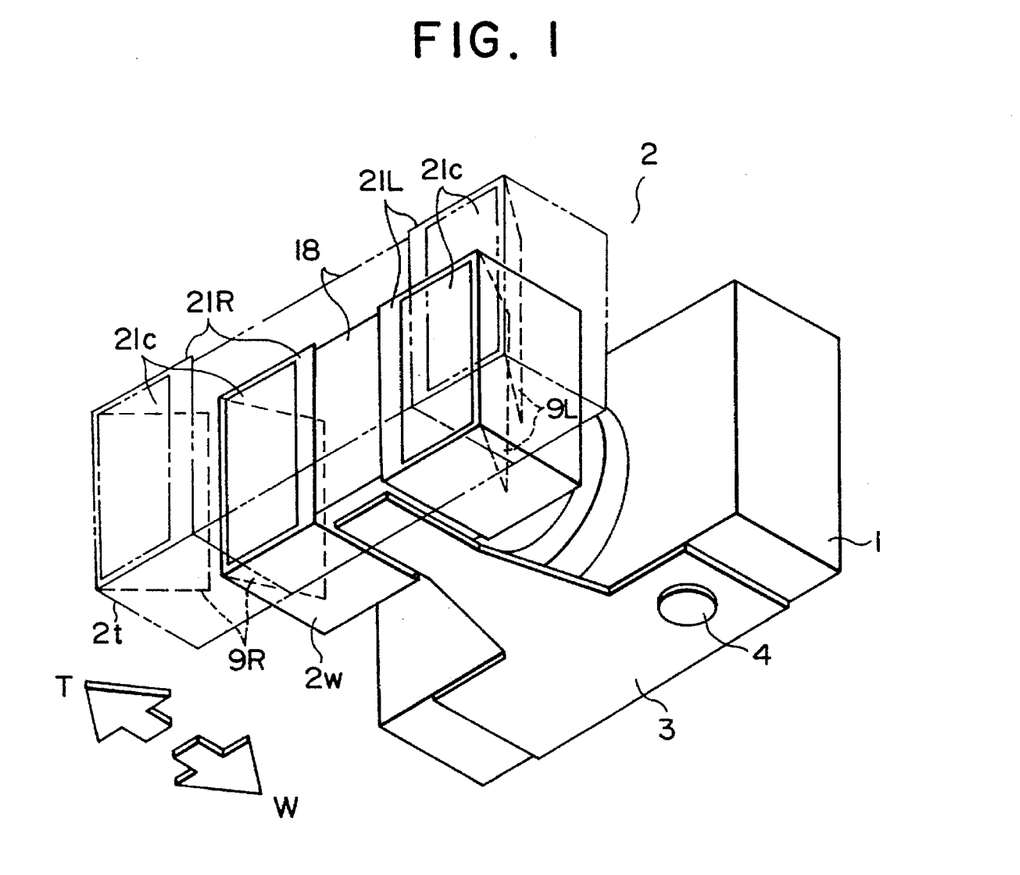
FIG. 1 is a view of the external appearance of a first embodiment of the present invention as seen from below.
Figure 2:
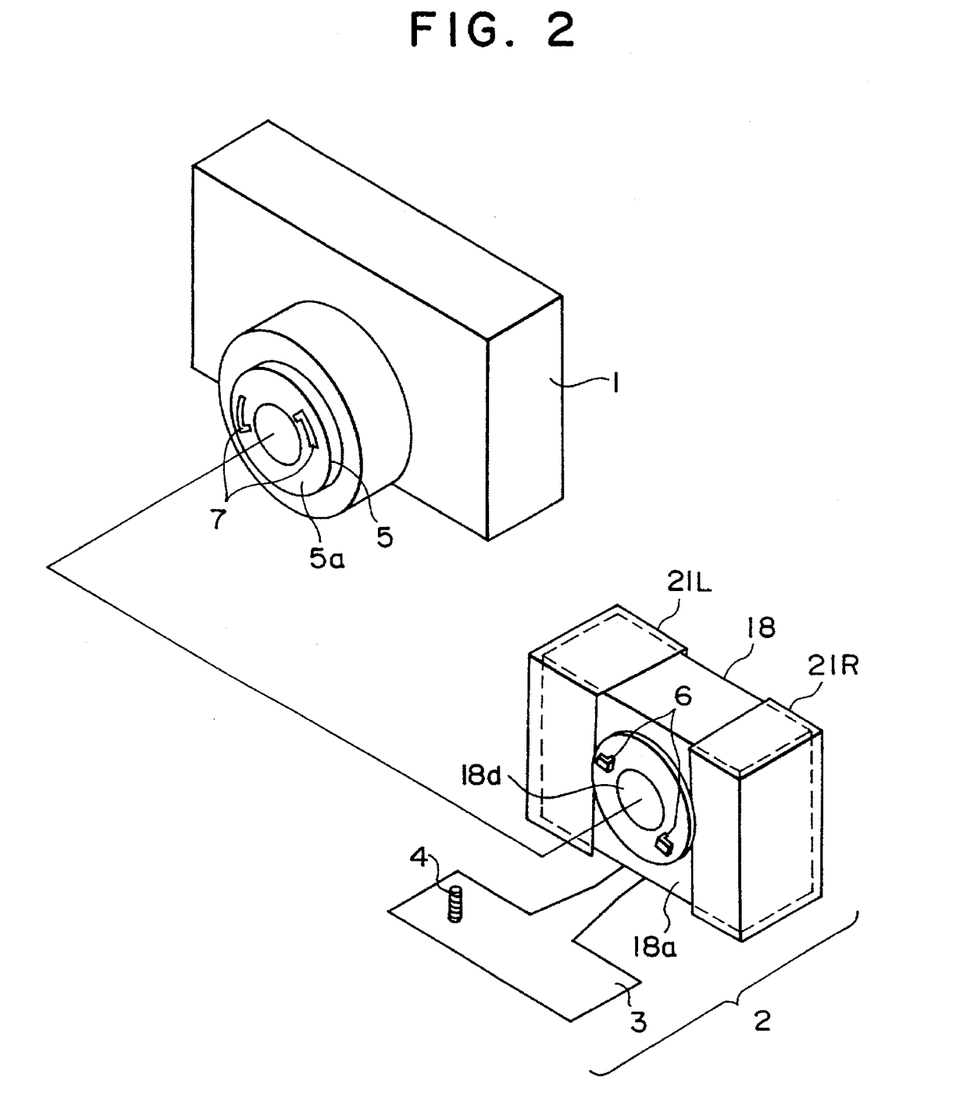
FIG. 2 is a perspective view for illustrating the mounting portion of the first embodiment of the present invention.
Figure 3:
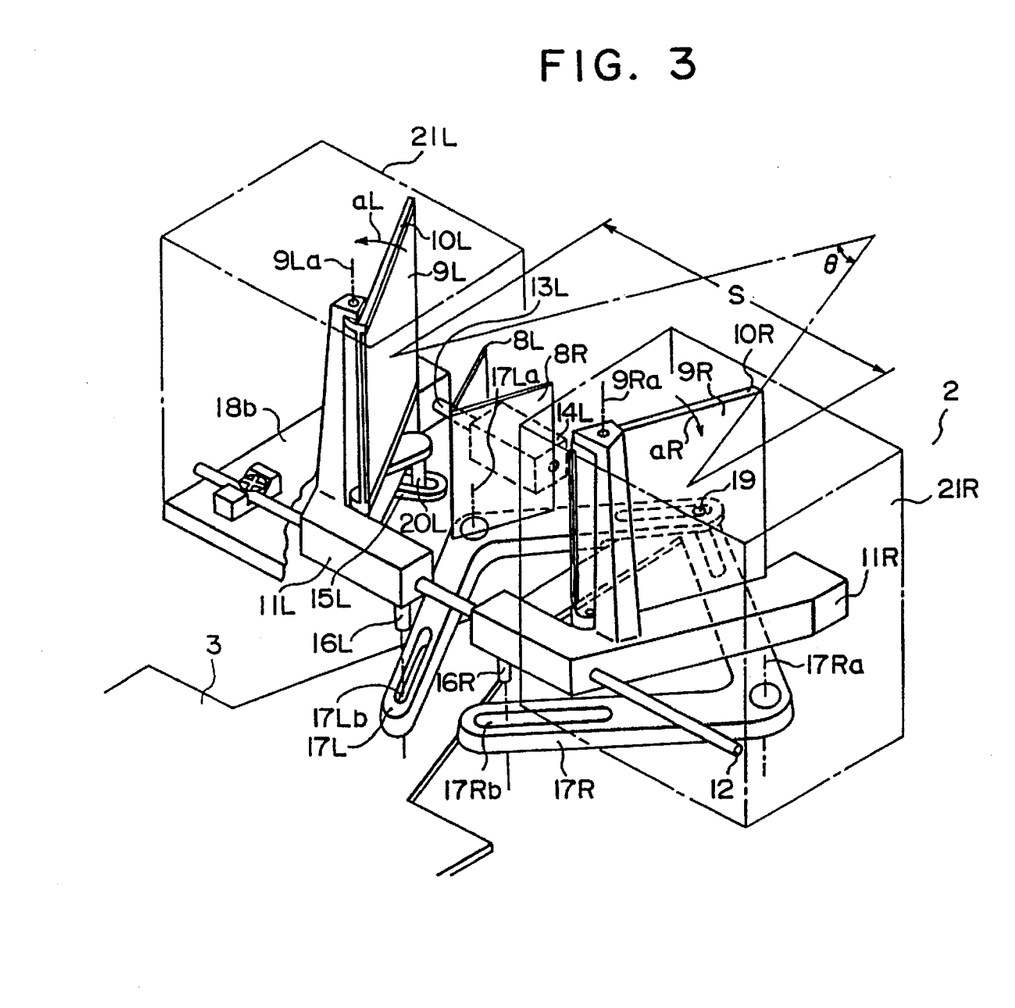
FIG. 3 is a perspective view for illustrating an interlocking mechanism in the first embodiment of the present invention.
Figure 4:
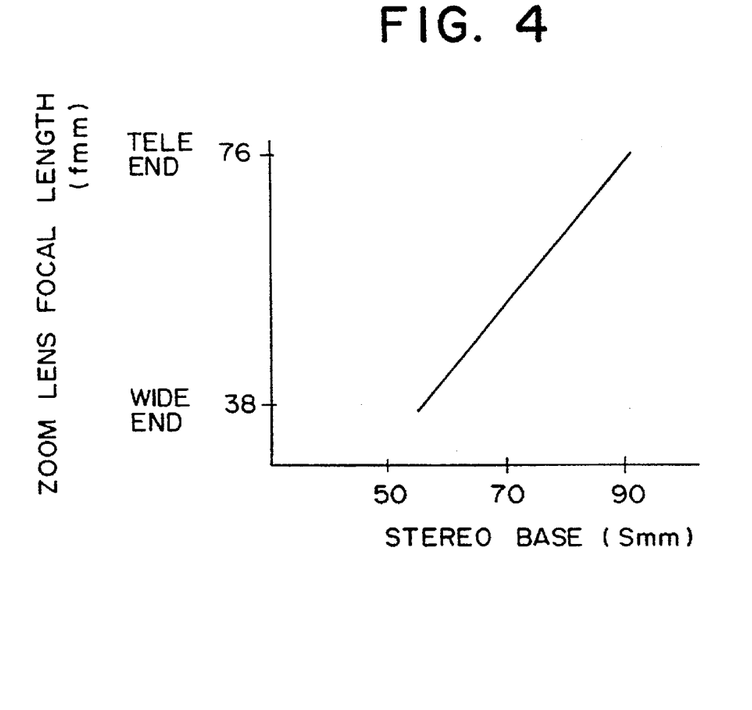
FIG. 4 is a graph showing the correlation between the focal length and stereo base of the zoom lens of the first embodiment of the present invention.
Figure 5:
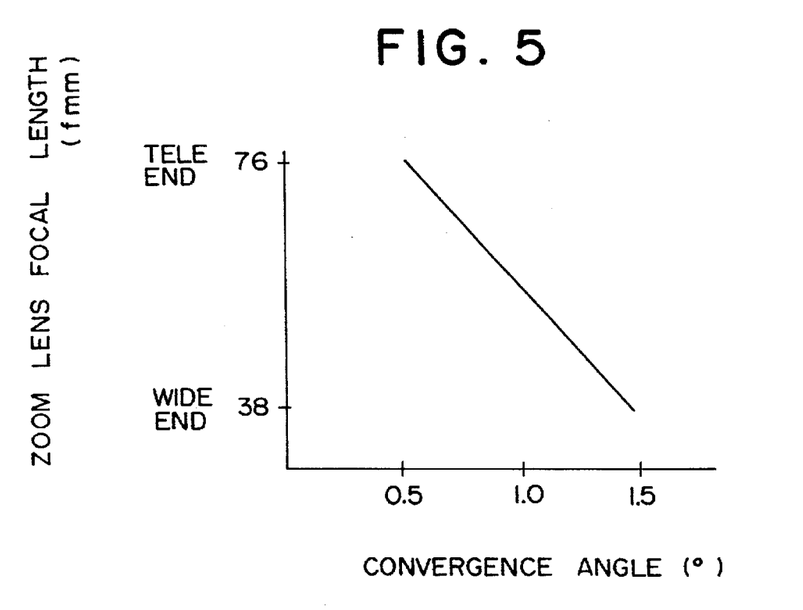
FIG. 5 is a graph showing the correlation between the focal length and convergence angle of the zoom lens of the first embodiment of the present invention.

FIG. 1 is a view showing the external appearance of the essential portions of the stereo adapter of the present invention when mounted forwardly of a photo-taking lens, FIG. 2 is an illustration of a mounting portion when the stereo adapter is mounted on a camera, FIG. 3 is an illustration illustrating an interlocking mechanism for changing the stereo base and convergence angle of the present invention, and FIGS. 4 and 5 are graphs showing a variation in the stereo base and a variation in the convergence angle, respectively, for the focal length of a zoom lens.

In these figures, the reference numeral 1 designates a camera body having a photo-taking zoom lens 5 (FIG. 2) having a focal length changing portion (hereinafter simply referred to as the zoom lens). The zoom lens 5 is of a construction in which the full length of the lens barrel (the distance from the camera body 1 to the front end of the lens) varies with a focal length change, and becomes longer by a focal length change toward the telephoto side and becomes shorter by a focal length change toward the wide angle side. The zoom lens 5 itself is well-known and therefore need not be described in detail.

The reference numeral 2 denotes a stereo adapter designed to be capable of being fixed forwardly of the zoom lens 5 by pawls 6 formed on the back 18a of a housing 18 being fitted to cut-away portions 7 formed in the front end portion 5a of the lens barrel of the zoom lens 5.

The reference numeral 3 designates a detecting plate (a connecting member) fixed in a tripod threaded hole (not shown) formed in the bottom portion of the camera body 1 by means of a set screw 4. This detecting plate 3 transmits the amount of axial movement of the zoom lens 5 relative to the camera body 1 to the stereo adapter 2.

In FIG. 1, when the zoom lens 5 is zoomed, for example, toward the telephoto side, the stereo adapter 2 moves forward (in the direction of arrow T in FIG. 1) from a state indicated by solid line 2w and the stereo base is enlarged, whereby the stereo adapter 2 assumes a state indicated by dots-and-dash line 2t.

The reference characters 9L and 9R denote mirrors as deflecting surfaces. These mirrors 9L and 9R are disposed at the left and right at an interval spacing relative to an object, and deflect a light flux from the object toward mirrors 8L and 8R (FIG. 3).

In the present embodiment, the deflecting surfaces are optical elements for directing the light flux from the object to the photo-taking lens and forming a stereo image, and are particularly disposed at the left and right at an interval spacing relative to the object, and this interval spacing corresponds to the stereo base of the stereo image.

The light flux from the object passes through the front opening portions 21c of housing frames 21L and 21R mounted integrally with mirror carriages 11L and 11R outside the housing 18 and laterally expandable and contractible with a variation in the stereo base, and is deflected by the mirrors 9L and 9R, and thereafter is reflected by the mirrors 8L and 8R and is directed to the zoom lens 5 through the rear opening portion 18d of the housing 18.

This light flux forms on film two object images having a parallax (stereo images), with one frame of the film divided into two, by the zoom lens 5.

The parallaxes of these stereo images are the differences in direction when a point on the object is viewed from two points of view, and the spacing between the two parallaxes is the stereo base. In the present embodiment, the spacing S between the mirrors 9L and 9R corresponds to the stereo base, and this stereo base is adjusted so as to obtain good stereo images.

The reference character 18b designates the bottom plate of the housing 18 which is fixed to the back 18a.

When the end portion 5a of the zoom lens 5 moves toward the object side (the telephoto side), the stereo adapter 2 moves therewith by the same amount. Thereby, the detecting plate 3 fixed to the camera body 1 is moved relative to the stereo adapter 2 and driving levers 17L and 17R engaged with a detecting pin 19 provided on the fore end portion of the detecting plate 3 are rotated about pivots 17La and 17Ra, respectively.

By this rotation, the mirror carriages 11L and 11R are moved along a carriage shaft 12 in a direction to widen the interval spacing therebetween through pins 16L and 16R engaged with slots 17Lb and 17Rb in the driving levers 17L and 17R, respectively.

Each of the mirror carriages 11L and 11R, on its side opposed to the carriage shaft 12, is provided with a shaft 13L parallel to the carriage shaft 12 (although the mirror carriage 11R side is not shown to avoid the complication of showing, it is the same mechanism), and the shaft 13L is extended through a bearing portion 14L provided on the bottom plate 18 of the adapter and is movably supported.

On the other hand, the mirror carriages 11L and 11R hold mirror receivers 10L and 10R holding the mirrors 9L and 9R for pivotal movement about pivot shafts 9La and 9Ra, respectively.

The mirror receivers 10L and 10R have respective pin portions (20L; 20R not shown) which are provided at the lower ends thereof engaged with respective cam slots 15 formed in the bottom plate 18 to thereby determine the angle of pivotal movement. (Although the mirror receiver 10R side is not shown, it is the same mechanism.)

The cam slots (15L, 15R) set the angle thereof relative to the carriage shaft 12 so as to appropriately adjust the convergence angle when the stereo base is changed. In the present embodiment, the angle is approximately 30' with respect to the direction of the carriage shaft 12, i.e., a direction orthogonal to the optical axis.

Thus, when the mirror carriages 11L and 11R move in a direction to widen (a direction in which the stereo base becomes longer), the mirror receivers 10L and 10R move in the same direction and the mirrors 9L and 9R rotate in the directions of movement (the directions of arrows aL and aR in FIG. 3). Thus, when the stereo base S becomes greater, the convergence angle θ decreases.

On the other hand, when the zoom lens is operated to move toward the wide angle side, the driving levers 17L and 17R engaged by the detecting pin 19 of the detecting plate 3 pivotally move in the direction opposite to that previously described, and the mirror carriages 11L and 11R move in a direction to narrow mutually through the pins 16L and 16R. At this time, the mirror receivers 10L and 10R move in a direction in which the convergence angle θ conversely becomes greater.

In the present embodiment, each of the mirror carriages 11L, 11R, the driving levers 17L, 17R, the carriage shaft 12, etc. constitutes an element of stereo base adjusting means. Also, each of the mirror receivers 10L, 10R, the mirror carriages 11L, 11R, the cam slot 15L, etc. constitutes an element of convergence angle adjusting means.

Variations in the stereo base S and the convergence angle θ in the present embodiment will now be described with some specific examples of the numerical values thereof mentioned.

FIGS. 4 and 5 show that in a stereo adapter mounted on a camera having, for example, a zoom lens of double magnification, the stereo base S has been varied from 56 mm to 90 mm and the convergence angle θ has been varied from 1.43° to 0.57°.

The set value of the stereo base is designed to have the greatest possible width in such a manner as to cover about 63 mm which is the spacing between human pupils so that not so exaggerated feeling may be provided for a near object and a stereoscopic feeling may not become scarce for a far object.

By so setting the stereo base, it is made possible to photograph the same range over 80% or more in each of stereo images irrespective of the photographing distance.

This value can be made optimum in conformity with the particular zoom lens mounted, on the camera and is not restricted to the aforementioned values.

Figure 6A:
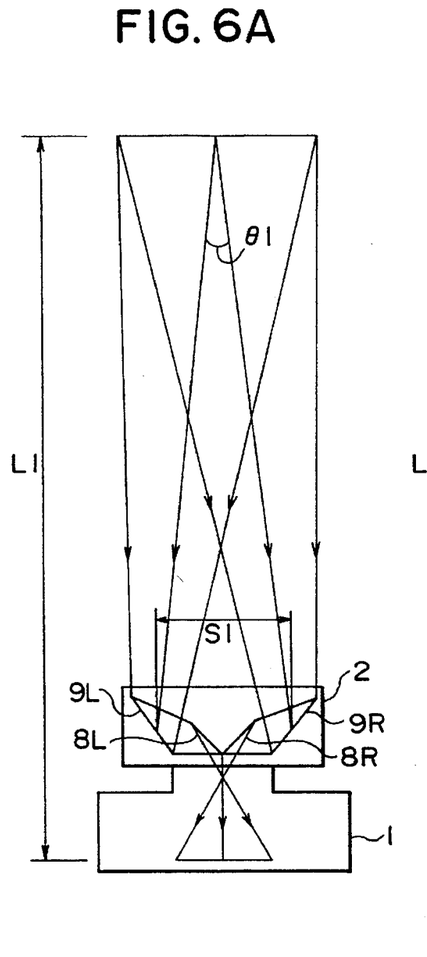
FIGS. 6A and 6B show the function of the apparatus according to the first embodiment.
Figure 6B:
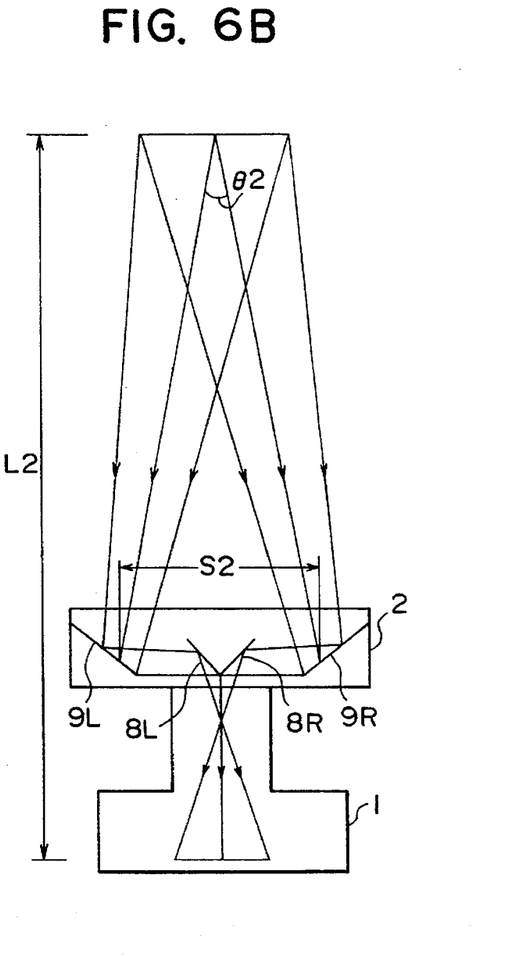

FIGS. 6A and 6B are illustrations of variations in the optical path resulting from focal length change, FIG. 6A showing the wide angle end and FIG. 6B showing the telephoto end. The light from the object enters the unit of the deflecting surface 9R and the mirror 8R and the unit of the deflecting surface 9L and the mirror 8L and forms light fluxes having a parallax therebetween.

When in FIGS. 6A and 6B, at the wide angle end and the telephoto end, respectively, the object distances are L1 and L2 and the convergence angles are θ1 and θ2 and the stereo bases are S1 and S2,

L2>L1, θ1>θ2, S2>S1.

Thereby, the stereo base and the convergence angle are varied with variations in the focal length of the zoom lens, whereby the ranges in which the left and right images are photographed are made substantially the same.

According to the present embodiment, when focal length change is effected, the stereo base and the convergence angle are appropriately adjusted therewith and therefore, over the entire focal length change range of the zoom lens, a good stereo image is obtained so that the zoom lens can be effectively utilized.

Also, the adjustment of the stereo base and the convergence angle is effected by a simple interlocking mechanism, whereby it is not necessary to specially provide communication means between the stereo adapter and the camera, a motor for driving each mirror, etc. Therefore, downsizing and light weight construction can be achieved, and any cost of contacts and the cost of the countermeasure for preventing noise are curtailed.

Further, according to the present embodiment, a stereo image is readily obtained without any special knowledge and machine parts being required.

While the present embodiment is designed such that two object images having a parallax are formed by the use of two deflecting surfaces (mirrors 9L and 9R), this is not restrictive; three or more object images having parallaxes among them may be formed, and in such case, two or more deflecting surfaces may be combined and used if the stereo base concerned in the parallaxes is designed to be adjusted with the focal length change of the zoom lens.

Figure 7:
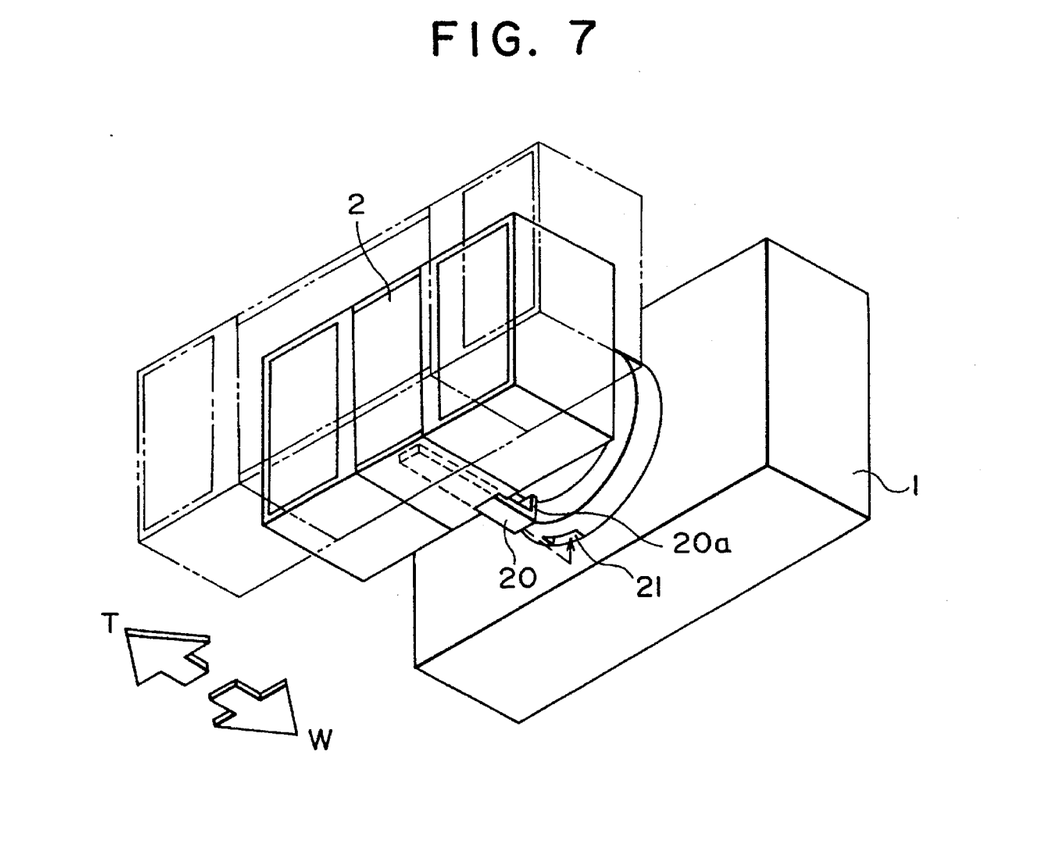
FIG. 7 show the external appearance of a second embodiment of the present invention.

FIG. 7 is a schematic view of the essential portions of a second embodiment of the present invention. This embodiment differs from the first embodiment in that during non-mounting, the detecting plate is containable in the stereo adapter, and in the other points, the construction of this embodiment is substantially the same as that of the first embodiment. In the present embodiment, the same elements as those in the first embodiment are given the same reference characters and some of them need not be described.

In FIG. 7, it is the same as the first embodiment that the stereo adapter 2 is fixed to the camera body 1 by the pawls 6 formed on the back 18a of the stereo adapter 2 being fitted into the cut-away portions 7 formed in the front end portion of the lens barrel of the zoom lens 5, and the main operation of the present embodiment is the same as that of the first embodiment.

The reference numeral 20 designates a detecting plate which transmits the amount of forward and backward movement of the zoom lens 5 to the stereo adapter 2. The detecting plate 20 is adapted to bring its bent portion 20a into engagement with a cut-away portion 21 formed in the lower portion of the lens barrel of the zoom lens 5.

This detecting plate 20 is provided in the interior of the stereo adapter and has its necessary length portion exposed to the camera body 1 side and therefore, the stereo adapter is excellent in portability.

As regards the mounting of the stereo adapter, the stereo adapter 2 is mounted on the lens barrel of the zoom lens 5, whereafter it is fitted into the cut-away portion 21 by utilization of the springy property of the detecting plate 20 in such a manner as to ride over the lens barrel of the zoom lens.

Consequently, it is desirable that a resilient member such as plastic or a steel plate for a spring be utilized as the detecting plate 20, and in the present embodiment, ABS resin is adopted, but this is not restrictive.

In the present embodiment, the detecting plate is made containable to thereby improve the portability of the stereo adapter.

Figure 8:
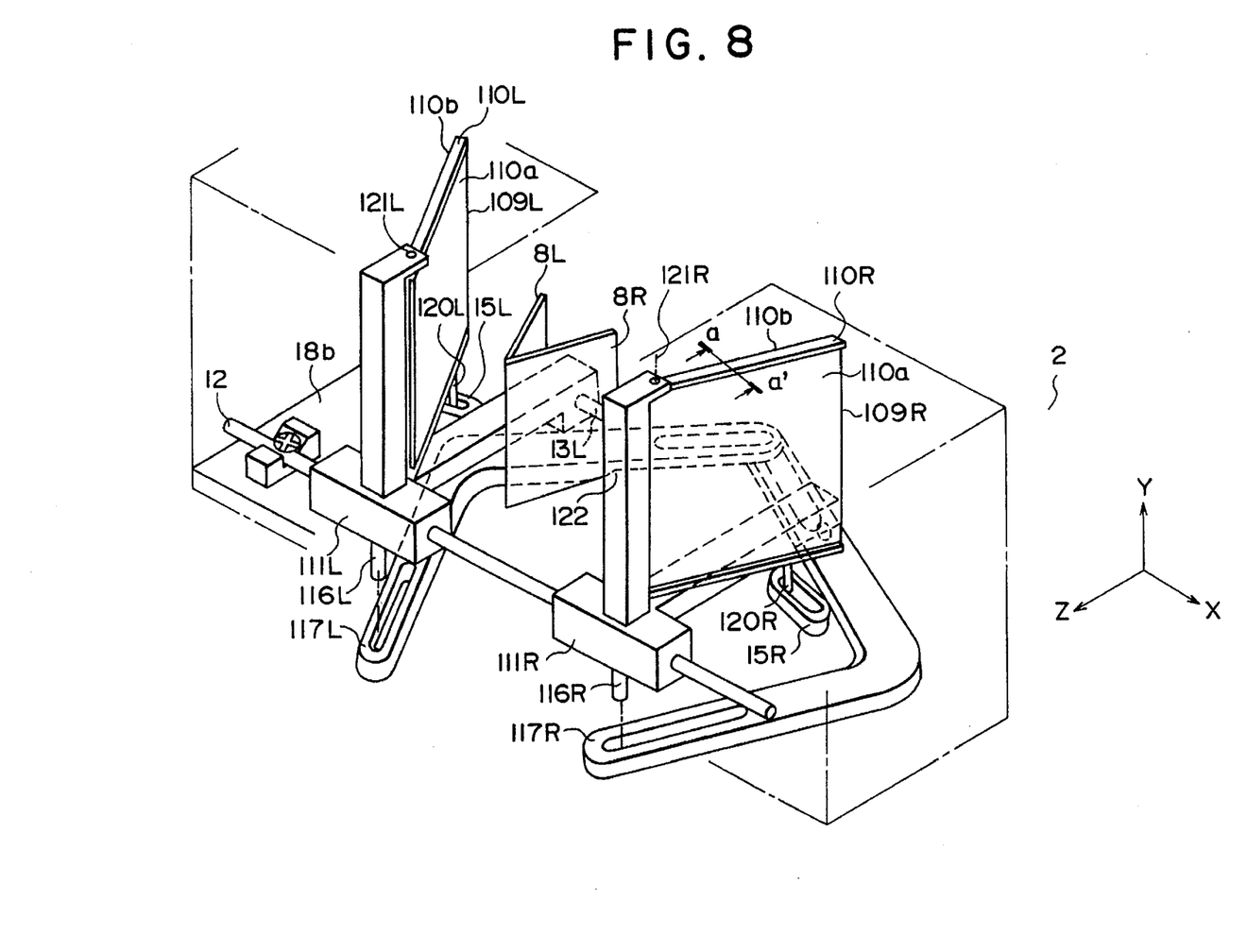
FIG. 8 is a perspective view showing the essential portions of a third embodiment of the present invention.

FIG. 8 is a schematic view of the essential portions of third embodiment of the present invention. This embodiment differs from the first embodiment in that elements for the left and right eyes are bisymmetrically disposed and the same members are used as the symmetrical members; in other points, the construction of this embodiment is substantially the same as that of the first embodiment. In the present embodiment, the same elements as those in the first and second embodiments are given the same reference characters and some of them need not be described.

It is the same as the first embodiment that the stereo adapter 2 is fixed to the camera body 1 by the convex portions 6 formed on the back 18a of the stereo adapter 2 being fitted into the cut-away portions 7 formed in the front end portion 5a of the lens barrel of the zoom lens 5.

In the present embodiment, among members constituting stereo base adjusting means for adjusting the spacing between mirrors 109L and 109R and convergence angle adjusting means for adjusting the angles of rotation of the mirrors 109L and 109R in a plane containing the center axis of a light flux from the object entering the mirrors 109L and 109R (in X–Z plane in FIG. 8), members concerned in the adjustment of one mirror 109L (a mirror 8L, a mirror receiver 110L, a mirror carriage 111L and a lever 117L etc.) and members concerned in the adjustment of the other mirror 109R (a mirror 8R, a mirror receiver 110R, a mirror carriage 111R and a lever 117R etc.) are disposed substantially symmetrically and the members at the symmetrical positions are of substantially the same shapes.

The mirror receivers 110L and 110R each have rib portions at the upper and lower ends thereof, and the cross-section thereof along line a—a' is I-shaped, and either surface 110a or 110b thereof enables the mirror to be fixed thereto.

Also, the pin portions 120L and 120R of the mirror receivers 110L and 110R are formed on the central portions of the lower surfaces of the mirror receivers 110L and 110R as viewed in the direction of line a—a'.

The mirror carriages 111L and 111R are of bisymmetrical shapes about the centers of rotation 121L and 121R of the mirror receivers 110L and 110R. Pin portions 116L and 116R engaged with driving levers 117L and 117R are also formed at the centers of the respective parts.

Thus, simply by changing the way of mounting the mirror receivers 110L and 110R, the parts can meet leftward and rightward movement in spite of being just the same parts.

Also, as regards the driving levers 117L and 117R, the same parts can be used at the left and right depending on which surface thereof contacting with the bottom plate 18.

In this case, the fore end portion 122 of each driving lever is made into a level difference shape to thereby prevent the interference between the parts.

In the present embodiment, as described above, the main movable parts when adjusting the stereo base and the convergence angle are all made into the same shapes usable at both of left and right, whereby it is made possible to increase the number of parts used to thereby enhance the effect of mass production and also decrease the number of molds for exclusive use to thereby suppress investment. The custody of the parts is also made easy.

In the above-described embodiments, the stereo base and the convergence angle are adjustable so that a good stereo image can be obtained over the entire focal length change range of the zoom lens, whereas the present invention is not restricted thereto, but design may be made such that the adjustment of the stereo base and the convergence angle is effected within only a focal length change range in which the best stereo image is obtained. In this case, for example, the stereo adapter and the zoom lens may be mechanically connected together through a connecting member to thereby limit the focal length change range so that focal length change cannot be mechanically done outside a preset focal length change range.

Further, while in the present embodiment, the adjustment of the stereo base and the convergence angle is effected with the variation in the full length of the lens barrel during focal length change being transmitted to the stereo base adjusting means and the convergence angle adjusting means, this is not restrictive, but the forward and backward movement or rotation of a member movable with focal length change, for example, a zoom ring, may be transmitted to the stereo base adjusting means and the convergence angle adjusting means through the detecting plate.

Also, in each of the above-described embodiments, the stereo adapter is mounted forwardly of the photo-taking lens, whereas this is not restrictive, but the stereo adapter may be disposed in the optical path of the photo-taking lens. For example, a construction in which an optical element such as a mirror or a filter is provided forwardly of the stereo adapter, or a construction in which the stereo adapter is disposed within the photo-taking lens (including a construction in which the deflecting surface is given a curvature and the stereo adapter functions as a portion of the photo-taking lens) may be adopted.

Further, while in each of the above-described embodiments, the drive force of the zoom lens during focal length change is transmitted to the stereo adapter by the interlocking mechanism, the present invention is not restricted thereto, but a driving motor may be disposed in the stereo adapter and the stereo base and the convergence angle may be adjusted on the basis of a signal from detecting means for detecting the focal length change state (focal length) of the zoom lens.

At this time, both of the stereo base and the convergence angle need not always be found from the focal length of the zoom lens, but when the stereo adapter according to the present invention is to be mounted, for example, on the photo-taking device (zoom lens) of a camera having automatic focus detecting means, the stereo base may be determined from the object distance found by the automatic focus detecting means and the focal length (magnification) of the zoom lens, and when this determined stereo base is adopted, such a convergence angle that the principal ray of a light flux forming a stereo image converges at said object distance may be set.

According to the present invention, there can be achieved a stereo adapter in which the position of the deflecting surface is appropriately set with the focal length change of the particular photo-taking lens mounted, to a camera whereby downsizing can be achieved and yet a good stereo image can be formed even if the focal length of the photo-taking lens fluctuates.

What is claimed is:

1. An adapter disposed forwardly of a photo-taking lens having a zooming function, said adapter comprising:
   an optical system having a plurality of deflecting members for deflecting light from an object, and for forming light fluxes having a parallax therebetween; and
   interlocking means for varying an interval spacing between said deflecting members in operative association with a zooming movement of said photo-taking lens.

2. The adapter of claim 1, wherein said interlocking means varies deflection angles of said deflecting members.

3. The adapter of claim 1, wherein the interval spacing between said deflecting members is shortest when a focal length of said photo-taking lens is shortest, and is longest when the focal length of said photo-taking lens is longest.

4. The adapter of claim 2, wherein a convergence angle formed by said deflecting members is greatest when a focal length of said photo-taking lens is shortest, and is smallest when the focal length of said photo-taking lens is longest.

5. The adapter of claim 1, wherein the interval spacing of said deflecting members is varied by utilizing a movement of a member adapted to move forward and backward in a direction of the optical axis in operative association with the zooming movement of said photo-taking lens.

6. A stereo image forming auxiliary apparatus disposed forwardly of a photo-taking lens having a zooming function, said auxiliary apparatus comprising:
   a plurality of deflecting members disposed at spacing intervals for deflecting light from an object;
   optical means for directing light fluxes from said deflecting members toward said photo-taking lens; and
   interlocking means for varying an interval spacing between said deflecting members in operative association with a zooming movement of said photo-taking lens.

7. The auxiliary apparatus of claim 6, wherein said deflecting members are tilted by said interlocking means in operative association with the zooming movement of said photo-taking lens.

8. The auxiliary apparatus of claim 6, wherein the interval spacing between said deflecting members is longest when the focal length of said photo-taking lens is longest.

9. The auxiliary apparatus of claim 6, wherein the interval spacing of said deflecting members is varied by utilizing a movement of a member adapted to move forward and backward in a direction of the optical axis in operative association with the zooming movement of said photo-taking lens.

10. A stereo image forming auxiliary apparatus disposed forwardly of a photo-taking lens having a movable member adapted to move forward and backward in a direction of an optic axis of the photo-taking lens in association with a zooming function of the photo-taking lens, said auxiliary apparatus comprising:
    a plurality of deflecting members disposed at spacing intervals for deflecting light from an object;
    optical means for directing light flux from said deflecting members toward said photo-taking lens; and
    interlocking means for tilting said deflecting members in operative association with movement of the movable member in the zooming function of said photo-taking lens.

11. The auxiliary apparatus of claim 10 wherein a convergence angle formed by said deflecting members is greatest when a focal length of said photo-taking lens is shortest.

12. A stereo image forming apparatus comprising:
    a camera provided with a zoom lens;
    an adapter removably mounted on said camera, said adapter comprising:
    a plurality of deflecting members for deflecting light from an object; and
    means for varying an interval spacing between said deflecting members in operative association with a zooming movement of the zoom lens.

13. A stereo adapter which is removably mounted in the optical path of a photo-taking lens having a zooming portion and in which a plurality of deflecting surfaces are disposed at spacing intervals and a light flux from an object is passed through said plurality of deflecting surfaces and thereafter is directed to said photo-taking lens to thereby form a plurality of object images having a parallax, wherein, in a plane containing the center axis of light flux entering said plurality of deflecting surfaces, a relative position of said plurality of deflecting surfaces is displaced in operative association with a zooming movement of said zooming portion.

14. The stereo adapter of claim 13, further comprising stereo base adjusting means coupled to a member movable with the zooming movement of said zooming portion through a connecting member, wherein an interval spacing between said deflecting surfaces is varied by said stereo base adjusting means.

15. The stereo adapter of claim 14, further comprising convergence angle adjusting means coupled to the member movable with the zooming movement of said zooming portion through a connecting member, wherein rotation of said plurality of deflecting surfaces is adjusted by said convergence angle adjusting means.

16. The stereo adapter of claim 15, wherein said stereo base adjusting means and said convergence angle adjusting means use at least some common members.

17. The stereo adapter of claim 14, wherein said stereo base adjusting means is designed such that the interval spacing between said deflecting surfaces is shortest when a focal length of said photo-taking lens is shortest, and is longest when the focal length is longest.

18. The stereo adapter of claim 15, wherein said convergence angle adjusting means is designed such that a convergence angle is greatest when a focal length of said photo-taking lens is shortest, and is smallest when the focal length is longest.

19. A stereo adapter which is removably mounted in the optical path of a photo-taking lens having a zooming portion and in which a plurality of deflecting surfaces are disposed at spacing intervals and a light flux from an object is passed through said plurality of deflecting surfaces and thereafter is directed to said photo-taking lens to thereby form a plurality of object images having a parallax, wherein zooming of said zooming portion is detected by detecting means, and forms the basis of a signal from said detecting means, and the relative position of said plurality of deflecting surfaces is displaced in a plane containing the center axis of the light flux entering said plurality of deflecting surfaces.

20. A stereo adapter which is removably mounted in the optical path of a photo-taking lens having a focal length changing portion and in which two deflecting surfaces are disposed at desired spacing intervals and a light flux from an object is passed through said two deflecting surfaces and thereafter is directed to said photo-taking lens to thereby form two object images having a parallax, wherein a member used in the adjustment of one of said deflecting surfaces and a member used in the adjustment of the other deflecting surface, of stereo base adjusting means for adjusting the spacing interval between said two deflecting surfaces, and convergence angle adjusting means for adjusting angles of rotation of said two deflecting surfaces in a plane containing a center axis of the light flux entering said two deflecting surfaces are substantially symmetrically disposed, and the members at the symmetrical positions are of substantially the same shape.

* * * * *

UNITED STATES PATENT AND TRADEMARK OFFICE
CERTIFICATE OF CORRECTION

PATENT NO. : 5,671,450  
DATED : September 23, 1997  
INVENTOR(S) : ETSUROU SUZUKI Page 1 of 3

It is certified that error appears in the above-indentified patent and that said Letters Patent is hereby corrected as shown below:

On title page,

At [56] References Cited

FOREIGN PATENT DOCUMENTS,
"576181  3/1993  Japan" should read
--5-76181  3/1993  Japan-- and
"3108242  11/1991  Japan" should read
--3-108242  11/1991  Japan--.

Column 1

Line 28, "divided" (second occurrence) should be deleted.
Line 55, "of" should read --of the--.
Line 61, "if" should be deleted.

Column 2

Line 25, "by" should read --designed for--.
Line 27, "is" should be deleted.

Column 3

Line 16, Close up right margin.
Line 17, Close up left margin.

UNITED STATES PATENT AND TRADEMARK OFFICE
CERTIFICATE OF CORRECTION

PATENT NO. : 5,671,450

DATED : September 23, 1997

INVENTOR(S) : ETSUROU SUZUKI

It is certified that error appears in the above-identified patent and that said Letters Patent is hereby corrected as shown below:

Column 4

Line 49, Close up right margin.
    Line 50, Close up left margin.

Column 5

Line 62, "cam slots 15" should read --cam slots (15L; 15R not shown)--.

Column 6

Line 2, "30'" should read --30°--.
    Line 39, "that" should read --that a--.
    Line 40, "feeling" should read --effect--.
    Line 41, "feeling" should read --effect--.
    Line 47, "mounted, on the camera" should read --mounted on the camera,--.

UNITED STATES PATENT AND TRADEMARK OFFICE
CERTIFICATE OF CORRECTION

PATENT NO. : 5,671,450

DATED : September 23, 1997

INVENTOR(S) : ETSUROU SUZUKI

It is certified that error appears in the above-identified patent and that said Letters Patent is hereby corrected as shown below:

<u>Column 8</u>

Line 6, "convex" should read --pawls--.
    Line 7, "portions" should be deleted.

<u>Column 10</u>

Line 47, "claim 10" should read --claim 10,--.

Signed and Sealed this

Twenty-fourth Day of March, 1998

BRUCE LEHMAN

*Attest:*

*Attesting Officer*    *Commissioner of Patents and Trademarks*